United States Patent

[11] 3,587,760

[72] Inventors Othmar Puhringer
Linz;
Karl Holik, Vienna, Austria
[21] Appl. No. 816,240
[22] Filed Apr. 15, 1969
[45] Patented June 28, 1971
[73] Assignee Vereinigte Osterreichische Eisen-und
Stahlwerke Aktiengesellschaft
Lonz, Austria
[32] Priority Apr. 17, 1968
[33] Austria
[31] A3717/68

[54] VEHICLE FOR TRANSPORTING AND WEIGHING METALLURGICAL VESSELS
5 Claims, 3 Drawing Figs.

[52] U.S. Cl. ................................................. 177/141,
177/146, 177/155, 177/163, 177/209
[51] Int. Cl. ........................................... G01g 19/04,
G01g 19/10, G01g 23/02
[50] Field of Search........................................... 177/163,
146, 155, 145, 141, 208, 209, 211, 253—255

[56] References Cited
UNITED STATES PATENTS
439,215 10/1890 Wanamaker................. 177/141X
439,217 10/1890 Wanamaker................. 177/141X
923,240 6/1909 Bradford..................... 177/209
925,282 6/1909 Bradford..................... 177/141X
1,254,335 1/1918 Malensheck................ 177/209X
1,579,658 4/1926 Pugh........................... 177/141
2,020,307 11/1935 Fitch........................... 177/141X
2,962,276 11/1960 Thurston..................... 177/211X
FOREIGN PATENTS
416,063 9/1934 Great Britain................ 177/141

Primary Examiner—Robert S. Ward, Jr.
Attorney—Brumbaugh, Graves, Donohue and Raymond ABSTRACT: The invention relates to a rail-supported transfer vehicle for metallurgical vessels which includes means for weighing the load supported thereon. According to the invention the vehicle comprises a double-frame construction, i.e. a lower frame supporting the traveling mechanism and an upper frame adapted to hold the load and normally resting on said lower frame. The weighing means are arranged in a cavity formed by corresponding recesses in the upper and lower vehicle frames and are operable on separation of said frames by extensible lifting means mounted in vertical alignment with said weighing means and preferably in axial alignment with the wheeled trucks of the vehicle.

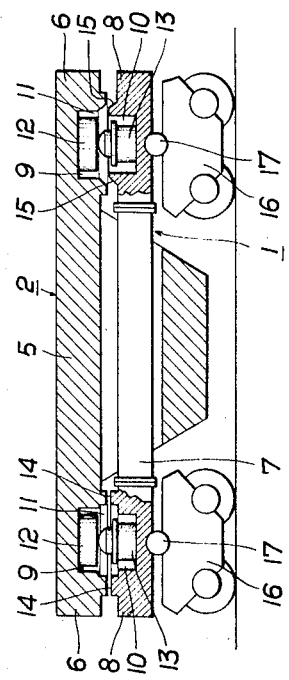
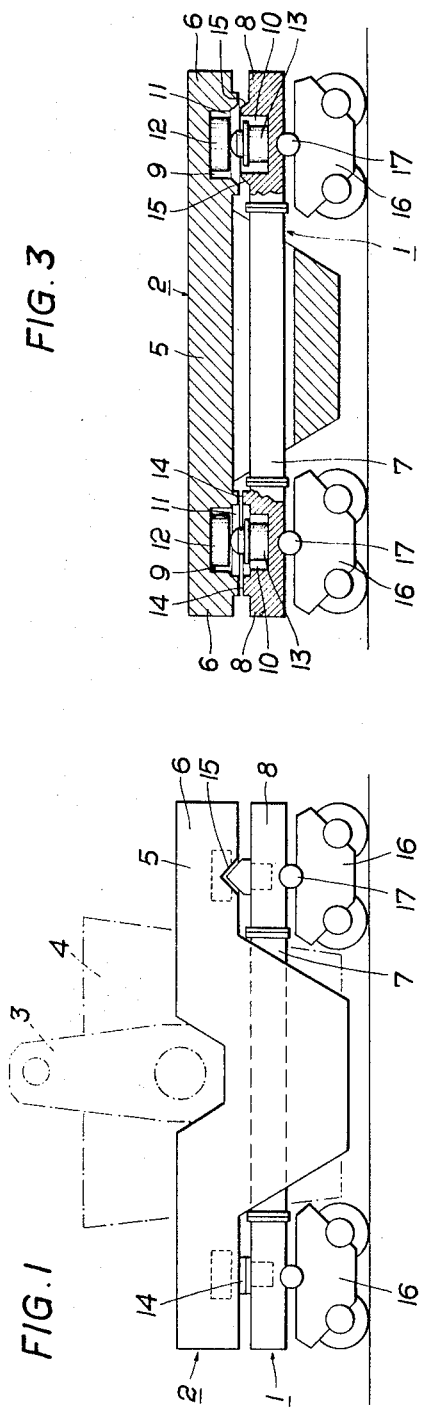
FIG. 3
FIG. 1
FIG. 2
INVENTORS
OTHMAR PUHRINGER &
KARL HOLIK
BY
their ATTORNEYS

VEHICLE FOR TRANSPORTING AND WEIGHING METALLURGICAL VESSELS

The invention relates to a vehicle for transporting and weighing metallurgical vessels such as ladles, buckets and the like.

In metallurgical plants it is frequently necessary to determine the weight of various materials, hot liquid or solid, before they are further processed. For this purpose it has been known to weigh a transport vehicle with the container of the material on a weighing machine arranged in the basement, e.g. on a platform balance. With rail transport vehicles, the track ways have to be interrupted at the platform balance. This known method has the disadvantage that owing to the great empty weights (tare weights) resulting from the weight of the transport vehicle and the weight of the container, the accuracy of the weighing result is impaired. Furthermore, a weighing machine can easily be damaged if it is arranged below the floor level of the steel works; it can be destroyed by splashing cut slag or by an emergency tapping of hot metal. Therefore, it is impossible to weigh a vessel while it is being filled with hot metal. If a stationary balance is used it has to be positioned at the greatest possible distance from the converter. Until now it has not been possible to meter a material during the weighing process.

The invention aims at avoiding these disadvantages and difficulties and has as its object to enable a satisfactory and safe determination of the weight of materials used in metallurgical plants, inclusive of hot metals; it is a particular object of the invention to provide for a transport vehicle with a built-in, safe weighing means.

According to the invention this problem is solved by the provision of a vehicle comprising a lower carriage carrying the traveling mechanism and an upper carriage arranged thereon and having a load platform or the like, a pressure-measuring and load-weighing device being arranged between the upper carriage and the lower carriage, which device is operable for weighing a load by means of a preferably hydraulic lifting device for the upper carriage, said lifting device being supported on the one hand against the pressure-measuring device and on the other hand against one of the carriages.

Owing to the arrangement of the weighing device in protected position between the upper carriage and the lower carriage the mechanical parts of the weighing device are not damaged by the inertia forces occurring during starting and braking of the vehicle, and the measuring result remains accurate.

According to a preferred embodiment of the invention, the upper carriage and the lower carriage are each composed of a frame with longitudinal and cross beams, a downwardly open recess being provided in the corners of the upper carriage frame and an upwardly open recess in the corners of the lower carriage frame, said recesses complementing each other to form a cavity closed to the outside and situated in a vertical plane above the bearings of the front and rear wheels and their rockers, respectively, a pressure-measuring device and a lifting device being arranged in each cavity.

Suitably, the longitudinal beams of the upper carriage have a boxlike design so that they enclose the longitudinal beams of the lower carriage.

According to another preferred embodiment of the invention the recesses complementing each other to form a cavity and containing the pressure-measuring device and the lifting device, are, on the one end of the vehicle, arranged to be indisplaceable in respect of each other in horizontal direction and thus form a fixed bearing, preferably in a way that the fitting faces of the recesses are designed to be slanting towards the horizontal line.

The division of the vehicle into an upper carriage and a lower carriage according to the invention offers great functional advantages. The lower carriage containing the wheel bearings and the rocker bearings, respectively, determines the wheel base and the gauge. The upper carriage carrying the load is, functionally, a bridge which is supported against the lower carriage during transportation. By arranging the weighing device and the lifting device in a vertical plane above the wheel bearings and rocker bearings, respectively, the lower carriage is loaded with tensile and compressive forces only, whereas the upper carriage accommodates the bending forces. By designing one of the bearings with which the upper carriage is supported on the lower carriage as a fixed bearing and the other bearing as an expansion bearing the advantage is gained that changes in length occurring on the frame portions as a result of temperature influences do not impair the accuracy of the weighing result.

The weighing device is loaded only during the time of weighing, when the upper carriage is lifted by means of the lifting device. After completion of weighing the upper carriage is lowered upon the lower carriage, measuring device is out of operation and is protected against damage and soiling as well as against exposure to heat by the abutting walls of the recesses of upper carriage and lower carriage.

In order that the invention may be more fully understood an embodiment thereof will now be described with reference to the accompanying drawing, in which FIG. 1 is a side view of the vehicle in traveling position, FIG. 2 is a top view of the vehicle according to FIG. 1, and FIG. 3 is a sectional view through the upper and lower carriages in weighing position.

The vehicle consists of the lower carriage 1 and the upper carriage 2. On the upper carriage 2 a load platform is arranged on some other receiving means suitable, e.g. for carrying loops 3, for the vessel 4 to be transported. Both the upper carriage 2 and the lower carriage 1 have a framelike shape. The upper carriage 2 comprises the longitudinal beams 5 and the crossbeams 6 and the lower carriage 1 comprises the longitudinal beams 7 and the crossbeams 8. In the area of the corners of the frames recesses are provided, i.e. the downwardly open recesses 9 of the upper carriage 2 and the upwardly open recesses 10 of the lower carriage 1. When the upper carriage is in its lowered position these recesses complement each other to form a cavity 11 which is closed to the outside, and of which there are four in total, of FIG. 2. In each cavity 11 a pressure or load-measuring device 12 is provided, in the embodiment shown in the recesses 9 of the upper carriage, as well as a lifting device, preferably hydraulic jacks 13, which, in the embodiment shown, are supported against the lower carriage on the one hand and against the pressure-measuring device on the other hand. When the hydraulic jacks are retracted, the upper carriage is supported on the lower carriage, i.e. on the one end (front end) of the vehicle by means of sliding plates 14, representing an expansion bearing, and on the opposite end (rear end) by means of bevelled fitting faces 15 slanting towards the horizontal line, representing a fixed bearing. Transversely to the traveling direction, the upper carriage is held by trapeziform guide blocks 18, which, when the upper carriage is lowered, engage in corresponding recesses of the lower carriage. In its lowered position the upper carriage is, therefore, completely fixed on all sides to the lower carriage and the pressure-measuring device is free from load. Inertia forces caused by acceleration, braking or shocks do not have any influence upon the weighing device. When the upper carriage is lifted by means of the hydraulic jacks 13, as shown in FIG. 3, the load pressure acts upon the weighing device so that it starts to operate, this, of course, for a short time only.

The lower carriage 1 carries the traveling mechanisms 16, which are suitably mounted by means of a rocker. The rocker bearing 17 is arranged vertically below the pressure measuring device 12 of FIG. 3, and below the hydraulic jacks 13, to afford the static advantages as pointed out hereinbefore. The upper carriage 2 represents a bending force support; the lower carriage 1 has to accommodate only tensile and compressive forces in horizontal direction. It connects the driven bogie car with the nondriven one. The longitudinal beams 5 of the upper carriage may be designed, as shown in FIG. 1, as boxlike carriers, enclosing the longitudinal beams 7 of the lower carriage.

When a pressure-measuring and load-weighing device is used which cannot accommodate transverse forces, the upper carriage has to be guided in an absolutely vertical direction so that no skewing occurs which might impair the weighing result. For this purpose bending guides made of leaf springs may be inserted between the upper and lower carriage. Suitably they are arranged side by side in a staggered manner between the jacks, i.e. in the four longitudinal parts.

We claim:

1. A railway vehicle for transporting and weighing metallurgical vessels, comprising a lower carriage carrying a traveling mechanism and an upper carriage mounted on said lower carriage and adapted to hold a vessel, a pressure-measuring and load-weighing device being arranged between said upper and lower carriages, said device being operable for weighing a load by lifting means for said upper carriage, supported on the one hand against said pressure-measuring and weighing device on the other hand against one of said carriages.

2. A railway vehicle for transporting and weighing metallurgical vessels, comprising a lower carriage supporting rocker mounted trucks with bearings for wheels, an upper carriage adapted to hold a vessel mounted on said lower carriage, a weighing device arranged between said upper and lower carriages, and hydraulic lifting means interposed between one of said carriages and said weighing device, said weighing device being exposable to load for weighing by said lifting means extending to lift said upper carriage off said lower carriage, said upper and lower carriages each comprising a rectangular frame of longitudinal and cross beams, a downwardly open recess being provided in the corners of said upper carriage frame and an upwardly open recess being provided in the corners of said lower carriage frame, said recesses complementing each other to form a cavity closed to the outside and situated in a vertical plane above said wheel bearings and rockers, each cavity housing a weighing device and a lifting means.

3. The vehicle set forth in claim 2, wherein said longitudinal beams of said upper carriage have a boxlike design so that they enclose the longitudinal beams of said lower carriage.

4. The vehicle set forth in claim 2, wherein, on one end of the vehicle, the abutting surfaces of said complementary, cavity-forming recesses engage each other to prevent any horizontal displacement, thus forming a fixed bearing.

5. The vehicle set forth in claim 2, wherein said upper carriage in its lowered position is held by trapeziform guide blocks engaging in corresponding recesses in said lower carriage.